United States Patent [19]

Lutz et al.

[11] Patent Number: 5,677,582
[45] Date of Patent: Oct. 14, 1997

[54] DRIVE UNIT

[75] Inventors: Dieter Lutz, Schweinfurt; Karl-Heinz Jakubowski; Günter Berger, both of Castrop-Rauxel; Horst Damm, Sprockhövel, all of Germany

[73] Assignee: Mannesmann Aktiengesellschaft, Düsseldorf, Germany

[21] Appl. No.: 581,512

[22] PCT Filed: Jun. 16, 1994

[86] PCT No.: PCT/DE94/00719

§ 371 Date: Jan. 11, 1996

§ 102(e) Date: Jan. 11, 1996

[87] PCT Pub. No.: WO95/01883

PCT Pub. Date: Jan. 19, 1995

[30] Foreign Application Priority Data

Jul. 9, 1993 [DE] Germany ............ 43 23 599.9

[51] Int. Cl.⁶ ............................................. H02K 7/116
[52] U.S. Cl. ............................ 310/75 R; 310/113; 310/114
[58] Field of Search ............................ 310/75 R, 113, 310/114

[56] References Cited

U.S. PATENT DOCUMENTS

| | | | |
|---|---|---|---|
| 4,274,023 | 6/1981 | Lamprey | 310/83 |
| 5,087,230 | 2/1992 | Yates et al. | 475/151 |
| 5,166,584 | 11/1992 | Fukino et al. | 318/139 |

FOREIGN PATENT DOCUMENTS

| | | | |
|---|---|---|---|
| 253999 A1 | 6/1986 | Germany | H02K 7/116 |
| 249807 | 6/1986 | Germany | H02K 7/116 |
| 445845 A2 | 9/1991 | Germany | B60K 1/02 |

Primary Examiner—Clayton E. Laballe
Assistant Examiner—Timothy A. Williams
Attorney, Agent, or Firm—Cohen, Pontani Lieberman & Pavane

[57] ABSTRACT

An electric drive unit for a vehicle is disclosed which has two electric machines axially aligned and connected with each other in mirror image. Each electric machine has a casing (3), a rotor (2) having a wheel body (16), an inner annular stator (4) including stator windings (5), having an axial, substantially cylindrical recess (11). The stator is attached to the casing (3), a rotor shaft (7) is attached to the wheel body (16) and extends into the substantially cylindrical axial recess (11) of the stator (4). There are first mounting means (20) rotatably mounted within the housing and relative thereto for mounting the rotor shaft (7); and an output coupling means (8, 9, 19, 25, 26) having a connecting flange (25, 26) for detachably connecting an output shaft thereto, the output coupling means (8, 9, 19, 25, 2 86) being disposed substantially within the axial cylindrical recess (11).

15 Claims, 3 Drawing Sheets

DRIVE UNIT

BACKGROUND OF THE INVENTION

1. Field of the Invention

The present invention relates to a drive unit which is intended for the transmission drive of road vehicles. The electric drive unit includes two electric machines having casings which are flanged at their ends in axial alignment. Each electric machine includes an outside rotor with a wheel body arranged on the end where the two electric machines are flanged to each other. It also includes an inner annular stator provided with stator windings and stator laminations with an axial, substantially cylindrical recess, the stator being rigidly attached to the casing. Further, it includes a rotor shaft rigidly attached to the wheel body and extending into the axial recess in the stator, and a mounting, which is rotatable with respect to the housing, for the rotor shaft to which a coupling device for the output is connected.

In order to be able to compete technically with traditional drives based on internal combustion engines and conventional drive lines, such transmission drives must produce high powers with as compact a construction as possible. In this connection, it is frequently of particular importance for the drive to produce a high torque at low speeds of revolution (for instance, upon starting). A construction as outside-rotor machine satisfies this requirement very well.

2. Background of the Invention

From EP 0 249 807 B1, a drive arrangement of this type is known. It is developed as a tandem motor, i.e. it consists of two individual electric motors which have their casings flanged to each other at their ends with mirror symmetry. The electric motors are each developed as outside-rotor machines; they have permanent-magnet excitation and their diameter is several times greater than their axial length. Thus, at low speeds of revolution, a higher torque can be made available than could be supplied directly by the electric motor if this drive unit were provided with speed-reducing gears. The output shaft of in each case one electric motor is at the same time the input shaft of a transmission association with it. The two parts of the drive unit which are mirror images of each other are flanged to each other forming a block at the ends of the transmission. Spur-gear or toothed-belt transmissions are provided as transmission. As a result of the two transmissions, the axial length of the drive unit is practically doubled; furthermore, its height or its diameter is considerably increased.

This known solution results in a definite increase in the available torque and represents a relatively compact construction as compared with older solutions. Nevertheless, it is desirable further to decrease the structural size and, in particular, the axial length. This is particularly important since universal-joint shafts must be connected to the drive unit in order to transmit the drive power to the drive wheels. Due to the inward and outward movement of the drive wheels resulting from the suspension during travel, the axes of rotation of the universal-joint shafts shift continuously with respect to their position at rest (deflection angle). The greater this deflection angle, the greater the wear in the joints (for instance homokinetic joints) of the universal-joint shafts. With the same absolute inward/outward spring action, the deflection angle is smaller the longer the universal-joint shaft. It is therefore necessary to arrange the coupling device between the universal-joint shaft and the rotor of the electric machine as far as possible from the corresponding drive wheel. For a drive unit of this type, this means that the distance between the coupling device of the two electric machines which are flanged to each other should be as small as possible.

From EP 0 253 999 an electric drive developed as individual motor having a permanent-magnet outside rotor is known. The motor has no casing protecting it from the outside. Its stator is developed as an annular body and has a planetary gearing in the space surrounded by it. The shaft of the rotor is provided with the sun wheel of the planetary gearing and is mounted in the stationary satellite carrier of the planetary gearing, the sun wheel being arranged between the two rotor-shaft bearings. The output drive of the planetary gearing takes place via the sun wheel, which is developed integral with the output shaft. The sun wheel is mounted exclusively via the bearings of the output shaft which are fastened to a substantially cylindrical base part with which the stator and the satellite carrier are also rigidly connected. The output shaft has no coupling devices for the detachable connection of elements for transmission of the torque.

SUMMARY OF THE INVENTION

The object of the invention is to provide a drive unit of the smallest possible size having a short axial length and, in particular, the smallest possible distance between the coupling devices of the two rotor shafts, high drive powers and, particularly at low speeds of rotation, high torques.

This object is achieved in accordance with the invention by providing a coupling device, connected to the rotor shaft which has a connecting flange for the detachable connection of an output shaft and which is arranged substantially within a cylindrical recess. Advantageous further embodiments of the invention provide a mounting of the rotor shaft within a hub body which is attached to the casing. The hub body is part of an inward-drawing of the casing which proceeds in each case from the outer end, extends into the cylindrical recess and, preferably ends close to the wheel body. The rotor shaft is mounted in each case overhung, preferably with the use of a double-row anti-friction bearing. The coupling device is developed as a connecting flange for a universal-joint shaft, the flange being attached, fixed for rotation, with the free end of the rotor shaft and further, it may also be developed as a speed-reducing planetary gearing with a connecting flange for a universal-joint shaft, the sun wheel of the planetary gearing being fastened, fixed for rotation, to the free end of the rotor shaft. The mounting of at least two of the three main functional parts, the sun wheel, the planet carrier and the hollow wheel is arranged in each case within the structural space surrounded by the stator windings. The rotor shaft may be developed as a hollow shaft. The substantially disk-shaped wheel body of the rotor may be developed as a deep-drawn part in one piece with the hollow rotor shaft. The hub body may form the planet carrier and the hollow wheel forms the output of the planetary gearing. The hollow wheel may be in each case firmly attached to the casing of the electric motor or is developed in one piece with it. The planet carrier may form the output of the planetary gearing. The rotor may be provided with a plurality of permanent magnets, and the electric current for the stator windings may be electronically commutated. The windings of the stator are in each case arranged in or directly at a coolant channel which is provided with a coolant feed line and a coolant discharge line and peripherally surrounds the installation space of the planetary gearing.

Also, one of the two electric machines may be developed as an electric motor while the other machine may be developed as an electric generator, and the electric motor may be connected, via a power electronic system controlled by an electronic control, with its current supply to the generator of an electric transmission.

A remote-controllable locking bolt may be arranged on the casing in the region of the parting plane between the two electric machines and may engage into locking grooves on the rotors upon actuation.

Basically, the invention provides for flanging the two electric machines by their outer casings to each other in such a way that the wheel bodies of their outside rotors face each other. The rotor shaft, which in each case provides the mounting of the rotor and via which the transmission of the torque takes place, therefore extends, starting approximately from the parting plane between the two electric machines, through the recess in it through the axial recess in the stator which is surrounded by the stator windings. The mounting of the rotor shaft is preferably an overhung mounting. A coupling device for the detachable connection of an output shaft, in particular a universal-joint shaft, is connected, fixed for rotation, to its free end. The coupling device, which can be developed as connecting flange for a universal-joint shaft, is arranged entirely or at least predominantly within the axial recess in the stator. It is particularly advantageous to develop the coupling device with an additional function in the sense of a planetary gearing which reduces the speed of rotation of the drive unit and correspondingly increases the torque and which has a connecting flange for connection to a universal-joint shaft. The construction in accordance with the invention makes it possible to keep the distance between the connecting flanges of the two electric machines very small so that the deflection angles to be expected of the universal-joint shafts which are to be connected remain very small. This applies also to the embodiment with planetary gearing. In each case, it is possible to minimize the distance apart in such a manner that, in the case of a vehicle with conventional differential transmission and universal-joint shafts connected thereto, the standard universal-joint shafts can be used unchanged also for an alternative electric drive of a corresponding vehicle equipped with a drive unit in accordance with the invention. As a general rule, the two electric machines are developed as electric motors and both of them either have or do not have planetary gearings, they being therefore constructed in the same manner. However, it is also possible, as is the case of an electric transmission, to operate one electric machine as generator and only the other as motor, in which case the current supply for the electric motor is assumed by the generator via an electronically controlled power electronic system. In order to be able to take up particularly high electric powers without damage, the drive unit is provided with fluid cooling, in particular liquid cooling, which assures a rapid removal of the loss heat from the stator windings.

The invention has the advantage that the short distance between the connecting flanges can be assured even with a high rated power of the electric machines used, without the diameter of the electric machines having to be particularly large, which favors the road clearance of the vehicle. A higher power can be readily obtained by a corresponding enlargement of the axial length of the active air gap between stator and rotor, without this having any substantial effect on the rotor shaft or the diameter of the axial recess. In addition, there is the advantage that simpler and cheaper carden joints can be used in the universal-joint shaft to be connected instead of expensive homokinetic joints.

BRIEF DESCRIPTION OF THE DRAWINGS

The invention will be explained in further detail below, with reference to the embodiments shown in the figures of drawing, in which.

DESCRIPTION OF THE DRAWINGS

Figure 1:
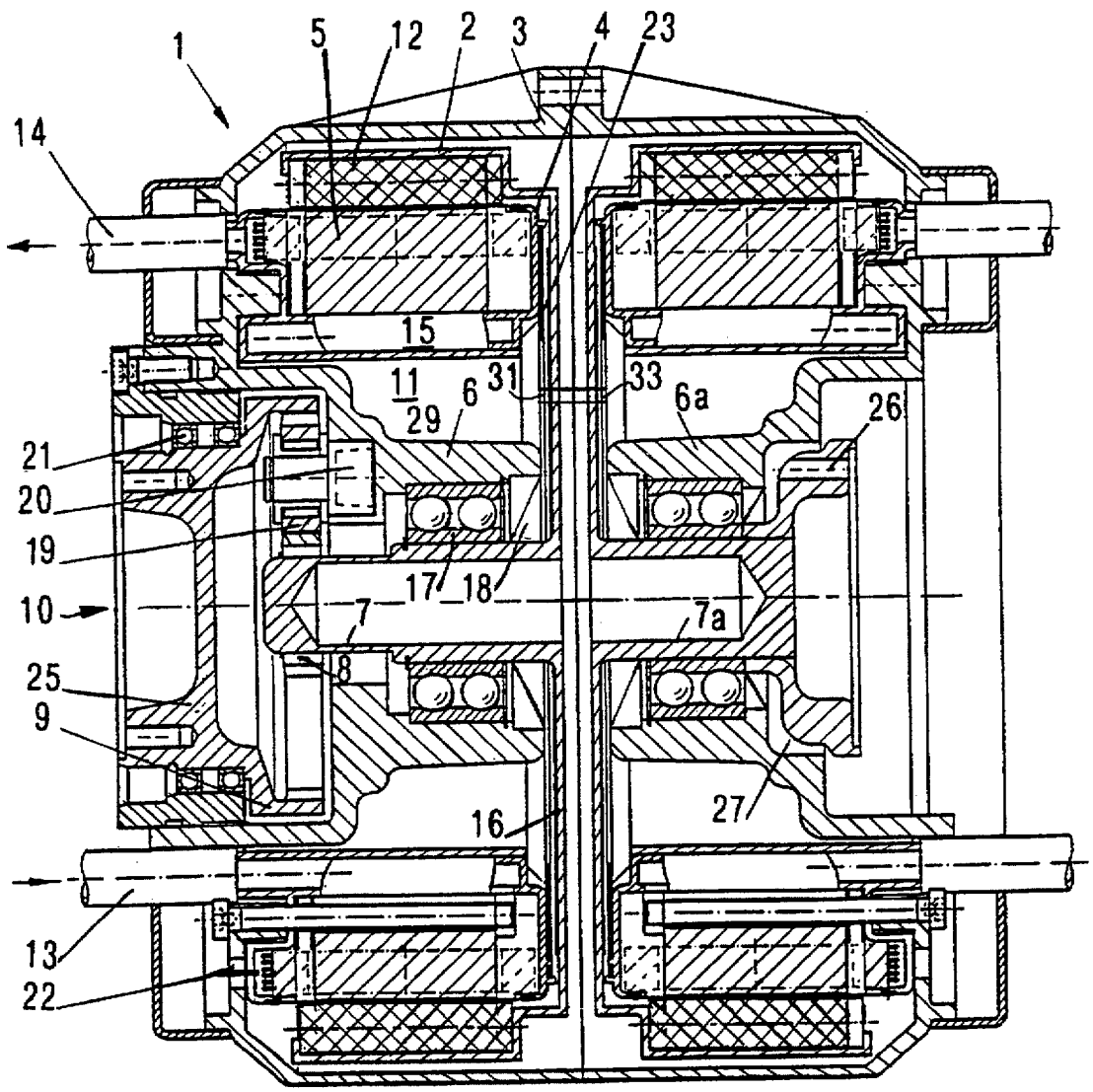
FIG. 1 is an axial longitudinal section through a drive arrangement in accordance with the invention, shown in two embodiments.

In FIG. 1, two embodiments of the invention will be described at the same time. In the left-hand half of the figure, the electric machine 1 is provided with a planetary gearing 10 for the mechanical transfer of power, while only a connecting flange 26 is provided in the right-hand half of the figure. In the form shown, the drive unit could operate, for instance, as electric transmission and to this extent also be useful. In this case, the electric machine on the right-hand side would be operated as generator and the electric machine 1 on the left-hand side as motor. The current supply for the motor would take place via an electronic control (not shown) using the electric power produced by the generator. As a general rule, however, the two electric machines are constructed with mirror imagery or completely identically. In the following, only the left-hand half of the figure will be described in further detail.

The electric motor 1, which, upon brake operation, can also operate as generator consists essentially of the outer casing 3 which, after assembly with a second electric motor to form a tandem unit, is preferably completely closed-off from the outside, and of the rotor 2 and the stator 4. The rotor 2 is provided on its circumference with a plurality of permanent magnets 12 of alternate polarity which are held by an outer frame of sheet metal or a high-strength plastic. The outer frame is firmly attached to a wheel body 16, preferably produced as a deep-drawn body of sheet metal, which as a substantially disk-shaped body is arranged at a short distance from and parallel to the right end of the stator ring formed of the stator windings and coaxial to it. In the region of the longitudinal axis of the electric motor 1, the wheel body 16 is developed in one piece as a hollow rotor shaft 7 directed towards the left to the opposite end side (outward side), the diameter of the rotor shaft being reduced in the region of its free end by a step as compared with its original diameter. The casing 3, which surrounds the rotor 2 on the outside at a small distance from it, is continued here over the left end the drive unit and is provided with fastening elements which hold the windings 5 (including the stator laminations) of the stator 4. Around the longitudinal axis of the electric motor 1, the stator 4 has a coaxial, substantially cylindrical recess 11 of large size. Into this recess, there extends, from the left end, the casing 3 of the electric motor 1 which continues into a hub body 6, the hub body 6 extending up to close to the wheel body 16. Via an anti-friction bearing 17 which is positioned in the region of the larger shaft diameter, the rotor shaft 7 is mounted overhung in the hub body 5. A packing 18 arranged between the anti-friction bearing 17 and the wheel body 16 seals the inside of the hub body 6 off from the outside. On the free end of the rotor shaft 7 there is mounted, fixed for rotation, the sun wheel 8 of a planetary gearing 10, it being thus mounted overhung in the same way as the wheel body 16.

The hub body 6 need not necessarily be a direct part of the casing 3 but can, for instance, also be attached to the stator 4. Instead of the overhung mounting of the rotor 2, a support could also be provided on both sides of the wheel body 16. For this, an additional partition wall can be provided in the region of the parting plane between the two casing halves of the drive unit, said partition wall being provided with corresponding mounting holes to receive anti-friction bearings. The sun wheel 8 of the planetary gearing 10 is mounted overhung in any event.

Figure 2:
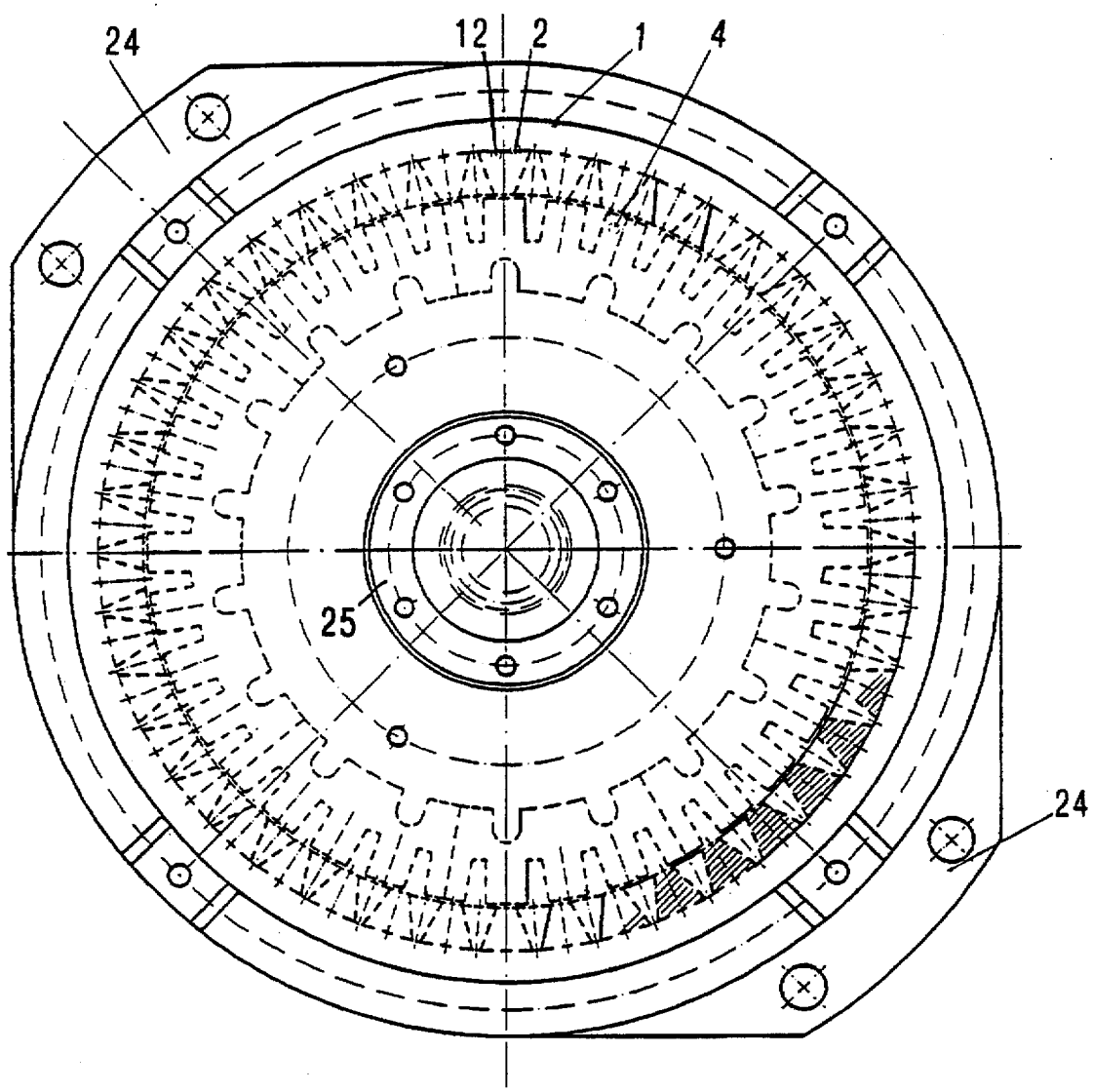
FIG. 2 is an end view of FIG. 1.
Figure 4:
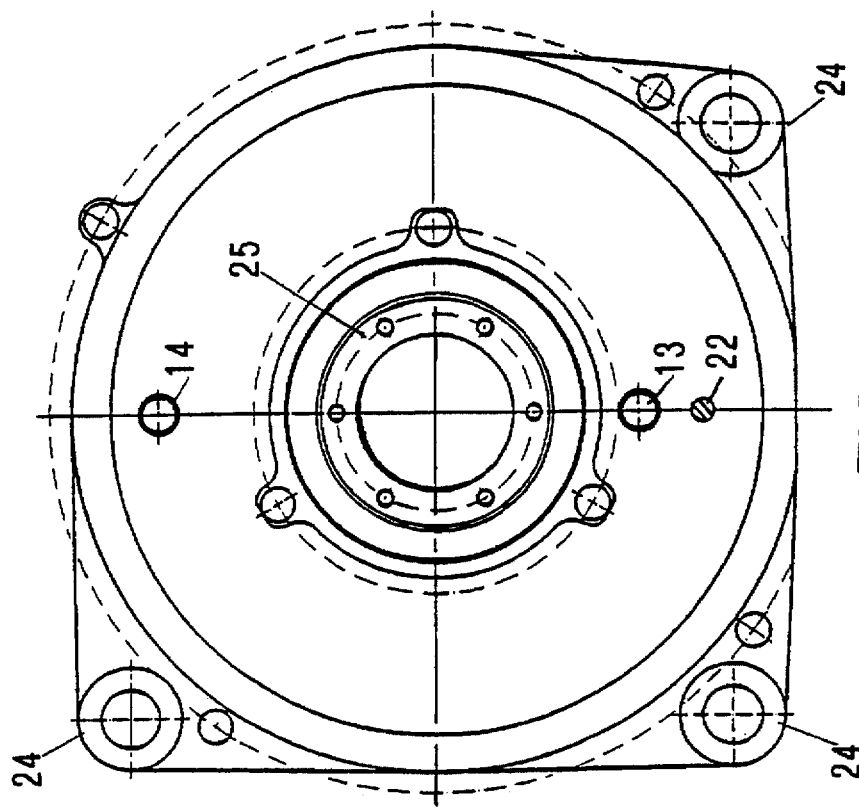
FIG. 4 is an end view of FIG. 3.
Figure 3:
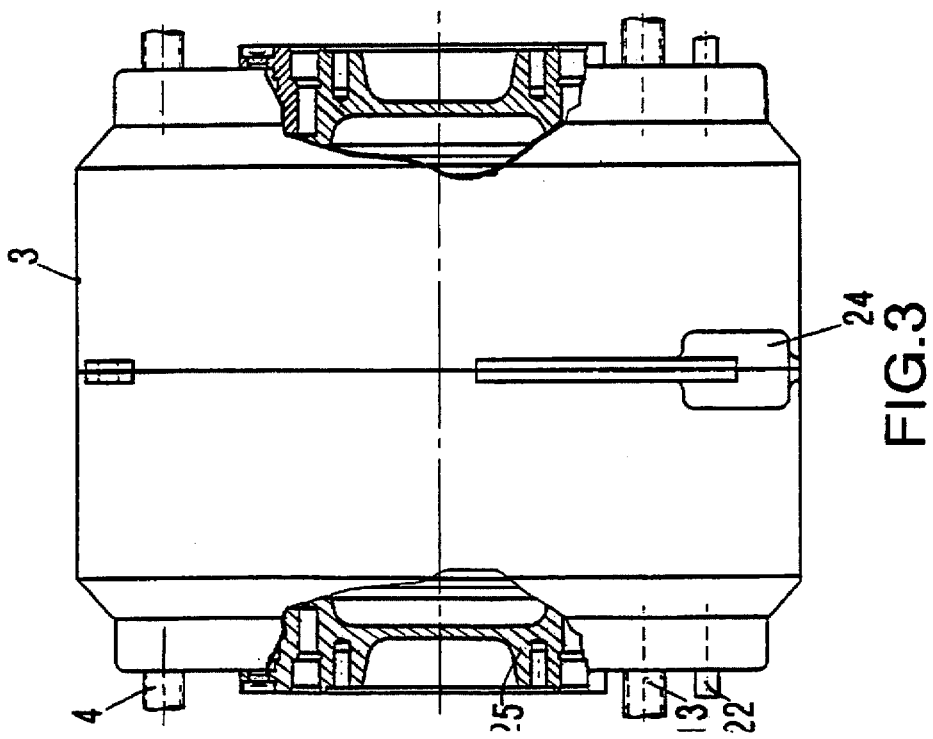
FIG. 3 is a side view, partially broken away, of a drive arrangement in accordance with the invention.

The sun wheel 8 meshes with the planet wheels 19 (only one of which is shown in FIG. 1) which are fastened rotatably on the hub body 6 via stub axles 20. The hub body 6 thus at the same time forms, in the structural unit, the planet 29 and the casing of the planetary gearing 10. The hollow wheel 10 on the left end, which engages with the planet wheels 19, forms the output shaft of the planetary gearing 10. For this purpose, it is continued towards the left in a short length of hollow shaft to which a drive shaft can be connected. The hollow wheel 9 is mounted on two anti-friction bearings 21 in the region of the end of the casing 3. The sun wheel 8 and the planet carrier 6 with the planet wheels 19 as well as the corresponding mounting lie, in the embodiment shown, in the same way as the toothing region of the sun wheel 10, substantially within the structural space enclosed by the stator windings 5 and are thus arranged in an extremely space-saving manner. Only the hollow-shaft part of the hollow wheel 9 extends slightly towards the left out of the casing 3 of this motor which is in any event already short axially (in the case of greater motor power, the length of the air gap between the stator and rotor would be larger). Thus, there is obtained an extremely short axial structural length for the entire tandem drive unit, without its diameter being increased as compared with that of the known solution. In the case of higher powers, the "inner axial length" of the drive unit can, as already described, be retained unchanged. In order to obtain particularly high electric powers referred to the required structural space, liquid cooling is provided in the embodiment in order to remove the loss heat, this liquid cooling also being developed in a space-saving manner. For this purpose, the windings 5 of the stator 4 are arranged directly on an annular coolant channel 15 of flat cross section which is provided with a coolant feed line 13 and a coolant discharge line 14. The coolant feed takes place first of all via the annular coolant channel 15 which peripherally surrounds the planetary gearing 8 and the purpose of which is to distribute the coolant in circumferential direction. The coolant can then flow over the windings and is removed together with the loss heat taken up via the discharge line 14. A feed line for the electric current to the windings 5 is indicated at 22. The reference numeral 23 designates a resolver system which serves for the precise determination of the relative angular position between the permanent magnets 12 of the rotor 2 and the magnet poles of the windings 5 of the stator 4. This angle information is required in order to commutate the electric current electronically at the proper time. In FIG. 2, which is an end view of the drive unit, the suspensions for the attachment of the drive unit in a vehicle are indicated at 24. A side view (partially broken away) of a tandem unit developed structurally identical with mirror symmetry and the corresponding end view are shown in FIGS. 3 and 4. As compared with the examples of FIGS. 1 and 2 in which the two halves of the casing 3 are made completely identical, the suspensions 24 are so arranged in FIGS. 3 and 4 that, while there is mirror symmetry, there is not a completely identical development.

The output of the planetary gearing 10 could also take place via the planet carrier rather than via the hollow wheel 9. In such case, the hollow wheel would have to be connected, fixed for rotation, to the hub body 6 (for instance, by being developed as a single piece with the hub body). In that case, reductions in speed by a factor of 2.5–5 could be readily obtained. In the embodiment in accordance with FIG. 1, the realizable range is about 1.5–4. By replacement of the planetary gearing for a different ratio, it is possible, in these solutions, to effect an adaptation to the drive requirements of different vehicles without changing the external dimensions and without changing the electromotive part. The further possibility of coupling the sun wheel of the planetary gearing with the casing and of coupling the hollow wheel with the rotor and effecting the output via the planet carrier is less advisable, particularly as the transmission ratio possible is only about 1.25–1.67.

The embodiment which is shown in the right-hand half of FIG. 1, agrees in construction, particularly with respect to the electromotive part, substantially to that shown on the left-hand half, so that, to this extent, no further explanations are necessary. Since no planetary gearing is provided, the hub body 6a has been slightly changed by incorporating a cylindrical recess 27 into which the connecting flange 26 for a universal-joint shaft (not shown) is partially introduced. Therefore, the hollow shaft 7a of the rotor is also made correspondingly shorter. In this way, there is obtained an extremely short axial distance between the connecting flanges 26 of a drive unit constructed with corresponding mirror symmetry. This makes it possible to maintain a very small angle of bend of the connected universal-joint shafts which therefore can be equipped with inexpensive carden joints.

The drive arrangements shown in the embodiments afford, in addition to the advantage of a compact, extremely strong torque and power drive, also the advantage of a clear saving in weight. The rotating masses, not least of all due to the thin-walled development of the rotor shaft 7 and of the wheel body 16, and in particular also the comparatively very small planetary gearing, are reduced to a minimum. This not only benefits the overall weight of an electric vehicle equipped therewith, but also its power of acceleration. Another advantage is that a holding brake, corresponding to a parking lock of a traditional automatic transmission can be developed in a very simple manner, since the rotors 2 and the wheel bodies 16 of the two electric motors 1 are arranged directly coaxially alongside of each other. A remote-controllable locking bolt 31 can be provided on the casing 3, it being arranged on the inside in the region close to the space between the two electric motors 1 and, in the event of the connecting of the parking lock, at the same time engaging into locking grooves which are arranged in each case on the rotor 2 (for instance, in the peripheral region of the wheel body 16), so that a securing of the rotors 2 and thus of the drive shafts of the vehicle against rotation is obtained.

We claim:

1. an electric drive unit for a vehicle having two electric machines axially aligned and connected with each other in mirror image, each electric machine comprising:

a casing (3), each casing having an end face, the casings being flange-connected at the end faces so as to be axially flush;

a rotor (2) disposed within the casing (3) and comprising a wheel body (16), the rotor being disposed on the end face;

an inner annular stator (4) including stator windings (5), having an axial, substantially cylindrical recess (11), the stator being attached to the casing (3);

a rotor shaft (7) attached to the wheel body (16) and extending into the substantially cylindrical axial recess (11) of the stator (4);

mounting means rotatably mounted within the housing and relative thereto for mounting the rotor shaft (7); and an output coupling means (8, 9, 19, 25, 26) having a connecting flange (25, 26) for detachably connecting an output shaft thereto, the output coupling means (8, 9, 19, 25, 26) being disposed substantially within the axial cylindrical recess (11).

2. The electric drive unit according to claim 1, further comprising a hub body (6, 6a) attached to the casing (3), the mounting means being arranged within the hub body (6, 6a).

3. The electric drive unit according to claim 2, wherein the hub body (6, 6a) is an integral part of the casing (3) extending inside and along the cylindrical recess (11) and terminating in close proximity to the wheel body (16).

4. The electric drive unit according to claim 1, wherein the rotor shaft (7, 7a) is cantileveredly mounted by a double-row anti-friction bearing (17).

5. The electric drive unit according to claim 1, wherein the connecting flange (25,26) of the coupling device (8, 9, 19, 25, 26) is non-rotatably connected to the rotor shaft (7, 7a) and includes means for connection to a universal-joint shaft.

6. The electric drive unit according to claim 2, wherein the coupling means (8, 9, 19, 25, 26) is a speed-reducing planetary gearing (10) comprising a connecting flange (25) for a universal-joint shaft, and a sun wheel (8), a planet wheel carrier (29) and a hollow wheel (9); the sun wheel (8) being non-rotatably mounted to the rotor shaft (7).

7. The electric drive unit according to claim 6, wherein the stator windings (5) define a space, and wherein at least two of the sun wheel (8), the planet carrier (29) and the hollow wheel (9) are mounted within the space.

8. The electric drive unit according to claim 1, wherein the rotor shaft (7, 7a) is a hollow shaft.

9. The electric drive unit according to claim 8, wherein the wheel body (16) of the rotor (2) is substantially disk-shaped and is an integral part of the hollow rotor shaft (7, 7a).

10. The electric drive unit according to claim 6, wherein the hub body (6) forms the means for mounting the planet wheel carrier (29) and the hollow wheel (9) forms the output of the planetary gearing (10).

11. The electric drive unit according to claim 6, wherein the hollow wheel (9) is fixedly attached to the casing (3), and the planet wheel carrier (29) forms the output of the planetary gearing (10).

12. The electric drive unit according to claim 1, wherein the rotor (2) comprises a plurality of permanent magnets (12), and the stator windings (5) are cummutated with electric current electronically.

13. The electric drive unit according to claim 1, further comprising means for cooling the stator windings (5), including a coolant feed line (13) and a coolant discharge line (14), and wherein the stator windings (5) are arranged peripherally surrounding the planetary gearing (10).

14. The electric drive unit according to claim 1, wherein one of the electric machines is an electric motor and the other electric machine is an electric generator; the electric motor being electronically controllably connected to a current supply of the generator such as to provide an electric transmission.

15. The electric drive unit according to 1, additionally comprising a remote-controllable locking bolt (31) arranged between the two electric machines for locking the respective rotors (2).

* * * * *